US006473138B1

(12) United States Patent
Fenner et al.

(10) Patent No.: US 6,473,138 B1
(45) Date of Patent: Oct. 29, 2002

(54) CUSTOM INSTALLATION TELEVISION RECEIVER WITH VARIABLE FRONT PANEL CONFIGURATION

(75) Inventors: Knut T. Fenner, Westfield, NJ (US); Richard Gioscia, Mahwah, NJ (US)

(73) Assignees: Sony Corporation, Tokyo (JP); Sony Corporation of America, Park Ridge, NJ (US)

(*) Notice: Subject to any disclaimer, the term of this patent is extended or adjusted under 35 U.S.C. 154(b) by 0 days.

(21) Appl. No.: 09/124,414

(22) Filed: Jul. 29, 1998

(51) Int. Cl.[7] .......................... H04N 5/64; H04N 5/645; H04N 5/72
(52) U.S. Cl. ................. 348/739; 348/787; 348/836; 348/839; 312/7.1; 312/7.2; 455/347; 455/348
(58) Field of Search ................. 348/787, 788, 348/789, 825, 826, 832, 836, 839, 840–3; 312/7.1, 7.2, 265.6, 242, 245; 455/347, 348; H04N 5/64, 5/645, 5/72

(56) References Cited

U.S. PATENT DOCUMENTS

| 4,572,592 A | * | 2/1986 | Haven | 312/7.2 |
| 4,898,555 A | * | 2/1990 | Sampson | 445/22 |
| 5,359,421 A | * | 10/1994 | Maeda | 348/818 |
| 5,782,544 A | * | 7/1998 | Johnson, Sr. | 312/7.2 |
| 5,862,468 A | * | 1/1999 | Kim | 455/346 |
| 6,005,641 A | * | 12/1999 | Ui | 348/836 |

OTHER PUBLICATIONS

Radio & Television News, Radio–Electronic Engineering edition, 1948, Office Telesets, p. 45.*

* cited by examiner

Primary Examiner—John Miller
Assistant Examiner—Paulos Natnael
(74) Attorney, Agent, or Firm—Jay H. Maioli

(57) ABSTRACT

A television receiver monitor intended to be built into a wall and used in connection with an audio/video entertainment center can be adapted to provide various visual aspects corresponding to the control capabilities of the user. When only a bezel surrounding the screen is visible, all controls are made through a control center unit of the audio/video entertainment center, so that the user must have a high degree of knowledge about the overall system, whereas when the bezel and a control panel are visible, the user need not extensively involve himself with the audio/video entertainment center except to control the audio portion of the program. When confronted with an unsophisticated or underage user, a speaker grill is provided in addition to the bezel and control panel, so that no interaction with the audio/video entertainment center is required by the user in order to enjoy a video and audio program.

3 Claims, 4 Drawing Sheets

CUSTOM INSTALLATION TELEVISION RECEIVER WITH VARIABLE FRONT PANEL CONFIGURATION

BACKGROUND OF THE INVENTION

1. Field of the Invention

This invention relates generally to a custom installation television receiver and, more particularly, to a custom installation television receiver in which the front panel exposed to the user can be varied depending upon the desired usage of the installed television receiver.

2. Description of Background

There is currently a trend toward larger and larger television receivers or monitors, that is, larger and larger display screens, and such large television receivers may be either the standard cathode ray tube kind or the projection kind.

Because such large television receivers appear somewhat unsightly when simply placed in a room, a further trend is to provide a custom-type installation, particularly in new homes, where the generally large television receiver is built into a wall of the viewing area.

It is also a present trend to provide a complete audio/video system within the home environment and, frequently, such audio/video systems can be quite complex in regard to the controls necessary to connect various program sources to the amplifiers, speakers, monitors and the like making up the system.

It is yet a further trend to use the television receiver in the home as a display for so-called video games, which are typically played by younger members of the family.

These various requirements for control of the television receiver in an audio/video system present a problem when it is desired to provide a custom installation, since different users have different control capability requirements and capabilities.

OBJECTS AND SUMMARY OF THE INVENTION

Accordingly it is an object of the present invention to provide a television receiver that can be custom installed in various manners to accommodate the requirements of different individual users of the television receiver.

Another object of the present invention is to provide a custom installation television receiver with a variable front panel configuration, so that different control capabilities can be provided, depending upon the requirements of the ultimate user of the system.

In accordance with an aspect of the present invention, a television monitor/receiver is provided that has a variable front panel configuration, so that in one configuration only the bezel of the television receiver is visible, in another configuration the bezel and a control panel are visible, and in a third configuration the bezel, the control panel, and a speaker grill are visible.

By providing an installation with only the bezel showing, the controls of the television receiver are hidden from view and the television receiver must be controlled by the control unit provided for the audio video system, which control units typically are complex. Thus, the installation of this embodiment is intended for the sophisticated user.

On the other hand, when the bezel and a control panel are provided, the television receiver can be controlled in its programming aspects by the controls provided on the control panel and different program sources can be selected by using the controls of the audio video system, which necessarily need not be complex. Thus, this embodiment permits the user to control generally the television receiver using the controls on the front panel.

Lastly, by providing the controls in the front panel, as well as the loudspeaker panel, the user need not know anything more than how to turn on the television and select a channel to enjoy all of the features provided by the television receiver.

The manner in which these and other objects, features, and advantages of the present invention are achieved will become apparent from the following detailed description of illustrative embodiments, to be read in conjunction with the accompanying drawings.

DETAILED DESCRIPTION OF PREFERRED EMBODIMENTS

Figure 1:
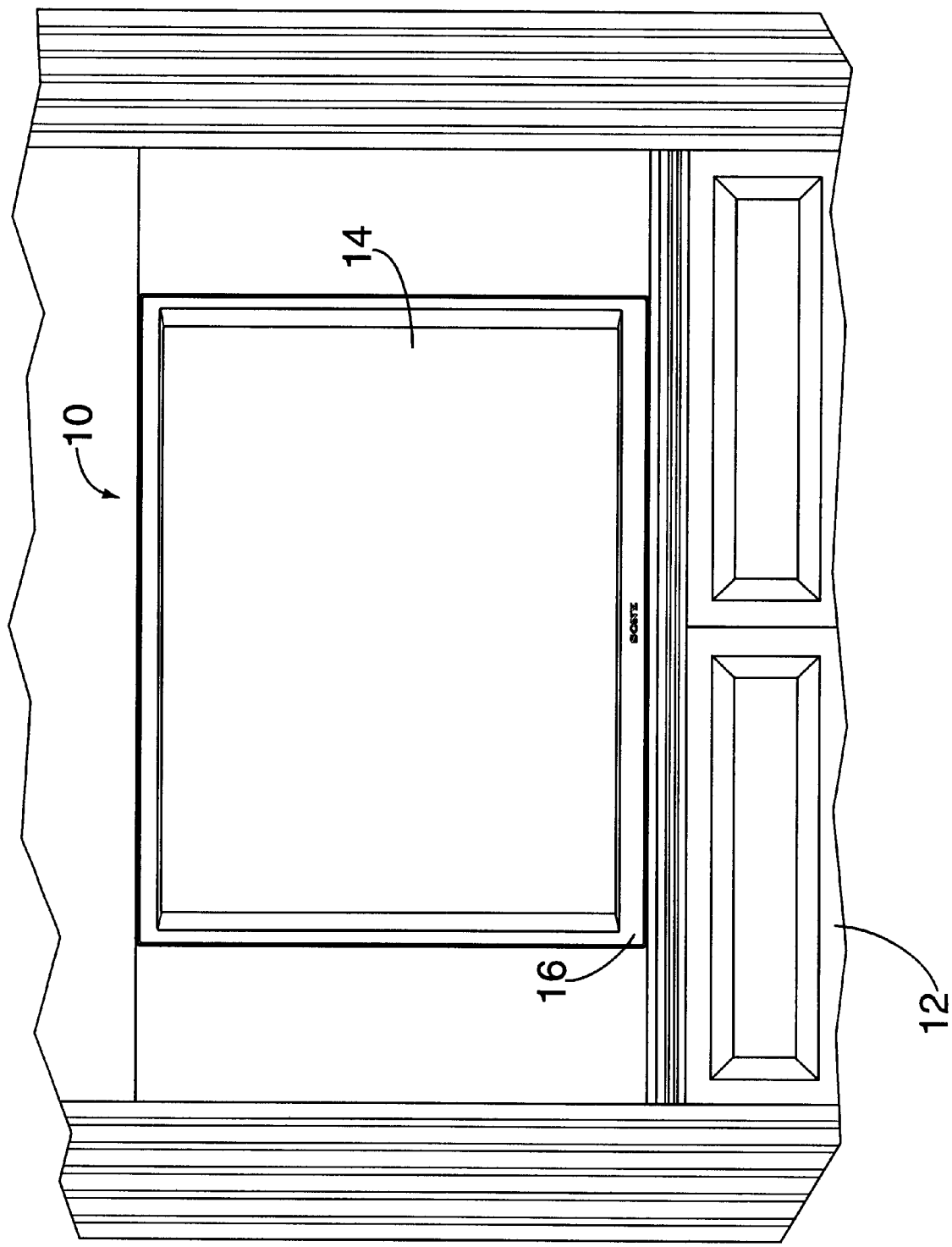
FIG. 1 is an elevational view showing a custom installation of a television receiver in a wall with only the screen and bezel showing, according to a first embodiment of the present invention.

FIG. 1 pictorially represents a first embodiment of the present invention in which a television receiver/monitor, shown generally at 10 is mounted in a wall 12 or the like of the viewing area, so that only the screen 14 and a main bezel 16 surrounding the screen can be seen. It is understood, of course, that the remainder of the television receiver/monitor 10 is hidden from view behind the wall 12. That hidden portion represents a standard, commercially available, television receiver/monitor. In this embodiment, because all of the controls and the like for the television receiver/monitor 10 are hidden, the receiver/monitor 10 is controlled and operated using the control center for the audio/video system that is becoming more a part of the home entertainment capability.

Figure 2:
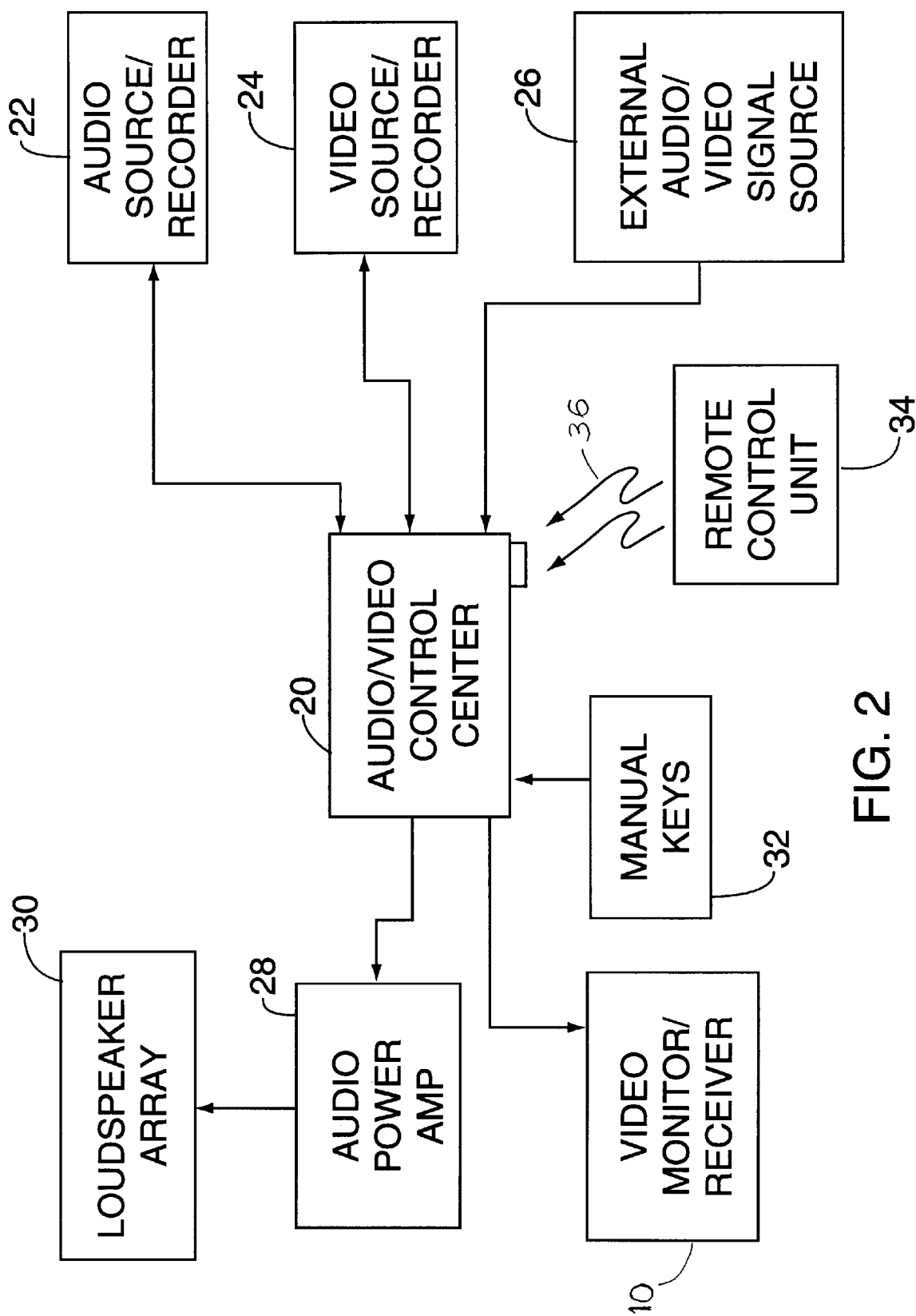
FIG. 2 is a circuit schematic in a block diagram form of a typical audio/video system useful with the present invention.

In that regard, FIG. 2 is a block diagram showing a typical audio/video system of which the video monitor/receiver 10 of FIG. 1 is a part. More specifically, as shown in FIG. 2, an audio/video control center 20 is provided and acts as the command center for the various units making up the system. For example, a typical audio/video system employs an audio source/recorder 22, which may be a tape deck, such as a digital audio tape (DAT) tape deck, and also a video source/recorder 24, which may be a video tape recorder (VTR). It is understood, of course, that other audio and video sources, such as laser disc, DVD, CD players, and the like may also be provided. Video and audio signals are fed into the audio/video control center 20, as represented by the external audio/video signal source 26, and such signals might comprise CATV cable, a broadcast satellite, or a digital satellite, or the like. The audio output of the audio/video control center 20 is fed to a power amplifier 28 that powers a loudspeaker array represented generally at 30. It is understood, of course, that the loudspeaker array 30 may employ a number of loudspeakers arranged around the listening and viewing area. The video output of the audio/video control center 20 is fed to the video receiver/monitor 10, which was shown generally in FIG. 1.

The operational command inputs provided by the user of the audio/video system are typically provided by a manual keypad 32 of the control center 20 or, alternatively, by a remote control unit 34. The remote control unit 34 communicates with the audio/video control center 20 by infrared rays, represented typically at 36.

In the embodiment of FIG. 1, while providing the most visually simple aspect as shown in FIG. 1, in fact, the control of that video monitor/receiver is more complicated. That is, in order to obtain the desired audio and video programs using the embodiment of FIG. 1, it is necessary for the user of the system to operate the audio/video control center 20 shown in FIG. 2. using either the manual keys 32 or the remote control unit 34. Thus, the embodiment shown in FIG. 1 is not intended for the unsophisticated user or for children.

Figure 3:
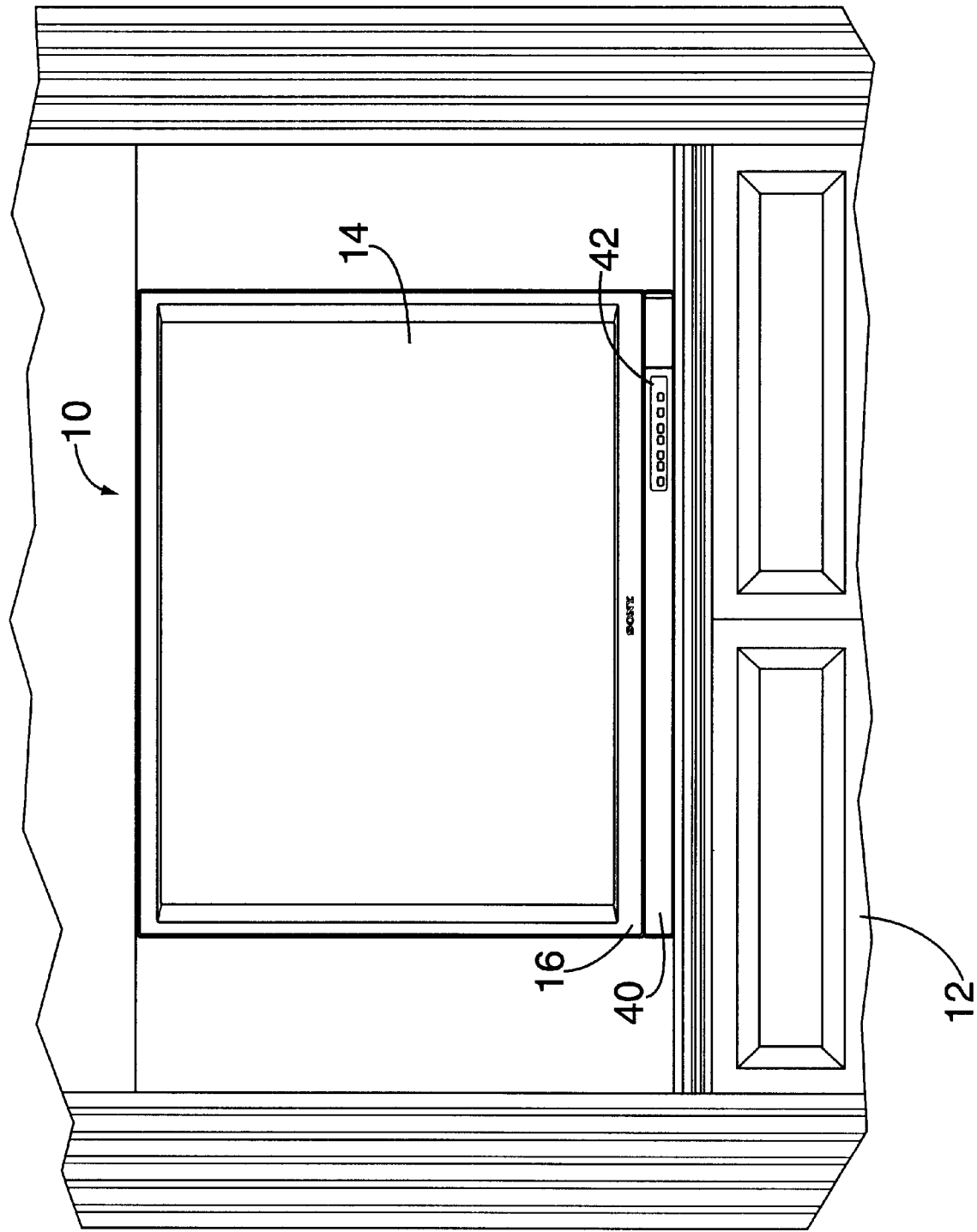
FIG. 3 is an elevational view of a custom installation of a television receiver in a wall with only the screen, the bezel, and a control panel showing, according to a second embodiment of the present invention.

In the second embodiment of FIG. 3 of the present invention, the visual aspect of the video monitor/receiver 10 is more complicated than in FIG. 1, but the control thereof is somewhat more simplified. More specifically, referring to FIG. 3, the video monitor/receiver 10 is shown installed in the wall 12 so that the screen 14 and the bezel 16 are visible, along with a control panel 40. This control panel extends along the bottom edge of the lower portion of the bezel 16 and typically contains manual controls 42 that can be operated manually by the user of the video monitor/receiver. These manual controls 42 correspond to the manual keys 32 of FIG. 2. In addition, the control panel 40 can include a window to receive the infrared signals 36 from the remote control unit 34.

Therefore, in the embodiment of FIG. 3 only simple controls are provided so that the television can be operated without using the audio video control center 20, which is substantially more complicated than the manual keys 42 of the audio/video control unit 20. Thus, the desired program material can be viewed on the screen 14, and the audio program material is played back through the loudspeaker array 30 connected to the audio/video control center 20 through the power amplifier 28.

Figure 4:
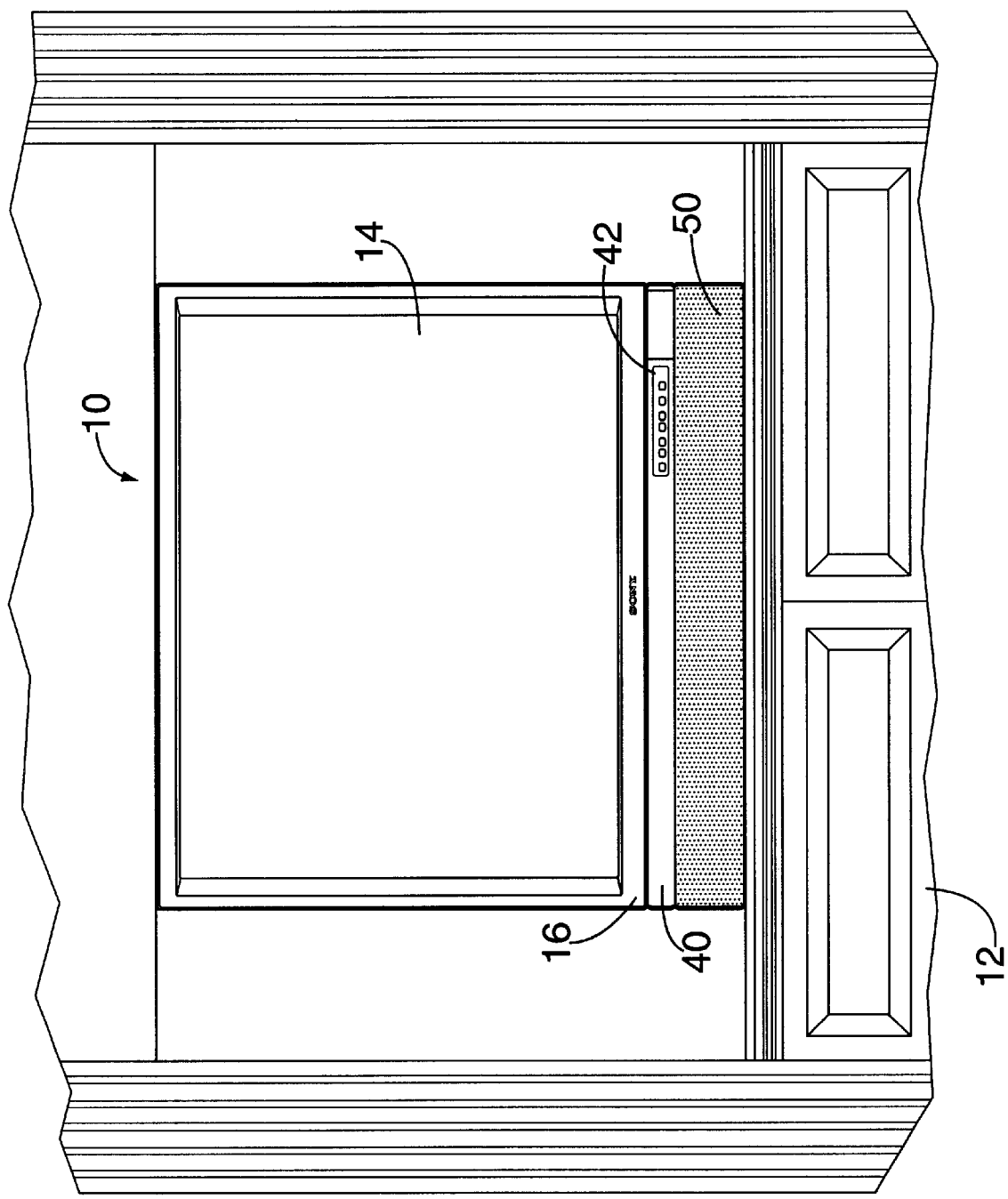
FIG. 4 is an elevational view of a custom installation of a television receiver in a wall, with the screen, the bezel, the control panel, and a speaker grill showing, according to a third embodiment of the present invention.

In the third embodiment of the present invention, the visual aspect of the video monitor/receiver 10 is presented at its most complicated when the video receiver/monitor 10 is installed in the wall 12. More specifically, as shown in FIG. 4, the bezel 16 is shown surrounding the screen 14 and the control panel 40 is provided with the manual controls 42 and, further, a loudspeaker panel 50 is provided to produce the audio program portion corresponding to the video program being displayed on the screen 14. The loudspeaker array 30, power amplifier 28, and the control center 20 of the overall system shown in FIG. 2 are not used.

Thus, in the third embodiment as shown in FIG. 4, only the simple, on-based controls 42 are required, and the television can be operated completely on its own, without energizing the audio/video system shown generally in FIG. 2. Thus, children may utilize the television 10 in this third embodiment to display the desired television programs or play video games without resort to operating or touching the complicated audio/video system.

According to the present invention, an adaptive custom installation television receiver is provided in which some embodiments are intended for use with an audio/video system, so that the user of the video monitor/receiver need not operate the audio/video system at all, in one embodiment, or may have any minimal contact with the audio/video system, in another embodiment. In addition, for the sophisticated user, all of the controls of the video monitor/receiver can be hidden from view behind the wall, and the monitor can be controlled completely from the audio/video control center.

It should be understood that the above description is presented by way of example only and that various adaptations and modifications of the present invention may be made without departing from the spirit and scope of the invention, which should be determined solely by the appended claims.

What is claimed is:

1. A system for mounting a video monitor of an audio/video system having a viewing screen wherein the video monitor is mounted in a wall in a selected one of three modes, the system comprising:

a bezel for surrounding the viewing screen;

an elongated removable control panel arranged along the extent of a lowermost edge of said bezel; and an elongated removable speaker panel arranged along the extent of a lowermost edge of said removable control panel, whereby upon selectively mounting said video monitor in the wall in a first mode of said three modes.only said bezel is used, in a second mode of said three modes only said bezel and said removable control panel are used, and in a third mode of said three modes said bezel, said removable control panel, and said removable speaker panel are used.

2. The custom installation kit of claim 1 wherein said audio/video system includes an audio/video control center and in said first mode operation of said monitor is controlled by said control center.

3. A system for use in installing in a wall a viewing screen of a video monitor in an audio/video system having a loudspeaker array and an audio/video control center, wherein the video monitor is selectively mounted in the wall in one of three modes said system comprising:

a bezel for surrounding a screen of the video monitor:

an elongated removable control panel arranged along the extent of lowermost edge of said bezel; and an elongated removable speaker panel arranged along the extent of a lowermost edge of said removable control panel, whereby in a first selected mode of said three modes said removable control panel and said removable speaker panel are removed and said viewing screen and said bezel are visible and operation of said video monitor is controlled by said audio/video control center and audio material is provided over said loudspeaker array, in a second selected mode of said three modes only said removable loudspeaker panel is removed and said viewing screen, said bezel, and said removable control panel are visible and operation of said monitor is controlled by said removable control panel and the audio material is provided over said loudspeaker array, and in a third selected mode of said three modes said viewing screen, said bezel, said removable control panel, and said removable loudspeaker panel are visible and operation of said monitor is controlled by said removable control panel and the audio material is provided over said removable loudspeaker panel.

* * * * *